COARSE AND FINE POSITIONING OF MAGNETIC READ HEADS

Filed Oct. 15, 1968 4 Sheets-Sheet 1

INVENTORS
EDMUND J. CROSSEN
RUDOLPH J. KLEIN
BY William E. Cleaver
ATTORNEY

COARSE AND FINE POSITIONING OF MAGNETIC READ HEADS

Filed Oct. 15, 1968 4 Sheets-Sheet 4

United States Patent Office 3,562,725
Patented Feb. 9, 1971

3,562,725
COARSE AND FINE POSITIONING OF MAGNETIC READ HEADS

Rudolph J. Klein, King of Prussia, and Edmund J. Crossen, Norristown, Pa., assignors to Sperry Rand Corporation, New York, N.Y., a corporation of Delaware Filed Oct. 15, 1968, Ser. No. 767,693
Int. Cl. G11b *21/10;* H01f *7/18*
U.S. Cl. 340—174.1 5 Claims

ABSTRACT OF THE DISCLOSURE

The present system provides a circuit whereby the electrical currents through the stator windings of a magnetic detent motor are (1) altered in phase relationship to effect a coarse positioning of magnetic read/write heads which are mechanically coupled to said magnetic detent motor and (2) altered in amplitude in response to a feedback signal in order that the rotor of the detent motor can be relocated by small increments, i.e., small distances.

The present invention is related to a closed loop servo system, and more particularly to coarse and fine positioning of magnetic read heads to be used with a magnetic recording device.

BACKGROUND

In the prior art of locating a magnetic head for reading data from a magnetic disk or a magnetic drum or the like, it has been the practice to employ some form of open loop servo system. In other words, in the prior art arrangements, data is fed to an open loop servo system which causes the device holding the magnetic read head to be moved in a coarse sense (some predetermined distance) and thereby locates the head so that it can read information from a selected track on the disk. In a typical open loop servo system there is no information fed back for correcting this coarse movement. Hence an error, which can occur because of the normal scope of movement, or play, in a gear train and/or because of the normal overshoot or undershoot of the rotor of a magnetic detent motor, can cause serious problems in the read back of information from a magnetic disk because the read head can be located to read from the wrong track. Accordingly, in the prior art, the packing or density of the information tracks is limited and it has been necessary to provide elaborate circuits to improve the reliability of information being read back.

SUMMARY

The present device is primarily employed with a means for locating magnetic read heads relative to magnetically recorded disks or drums or the like, but obviously can be employed in other closed loop servo systems. In the present system there is a magnetic detent motor whose rotor is engaged (by a gear train) with a bar holding magnetic read heads. Information is transmitted to the stator windings of the magnetic detent motor to initially effect a coarse movement of the rotor to a position whereat the iron of the rotor is equally divided by an imaginary line defining the effective north-south magnetic poles of a magnetic field developed by electrical currents in the stator windings. Thereafter the system acts to compare signals from two adjacent tracks on a magnetically recorded disk at the location which was derived from the coarse movement of the rotor. The comparison provides a signal which adjusts the electrical currents passing through the stator windings such that the resultant flux effecting the rotor will cause the rotor to move small distances, thereby compensating for the errors developed in the gear chain as well as the overshoot and undershoot of the rotor.

The features and objects of the present invention will become more apparent when the description thereof is considered in conjunction with the following figures.

The description of the present invention is made in conjunction with the locating of a magnetic read head over, or in contact with, magnetic information tracks on a magnetic disk.

It should be pointed out that while the invention is described in connection with locating a magnetic read head on a disk, it can be advantageously used in other closed loop servo systems for effecting refinements, or small movements, of an element.

Figures 1A, 1B, 1C:
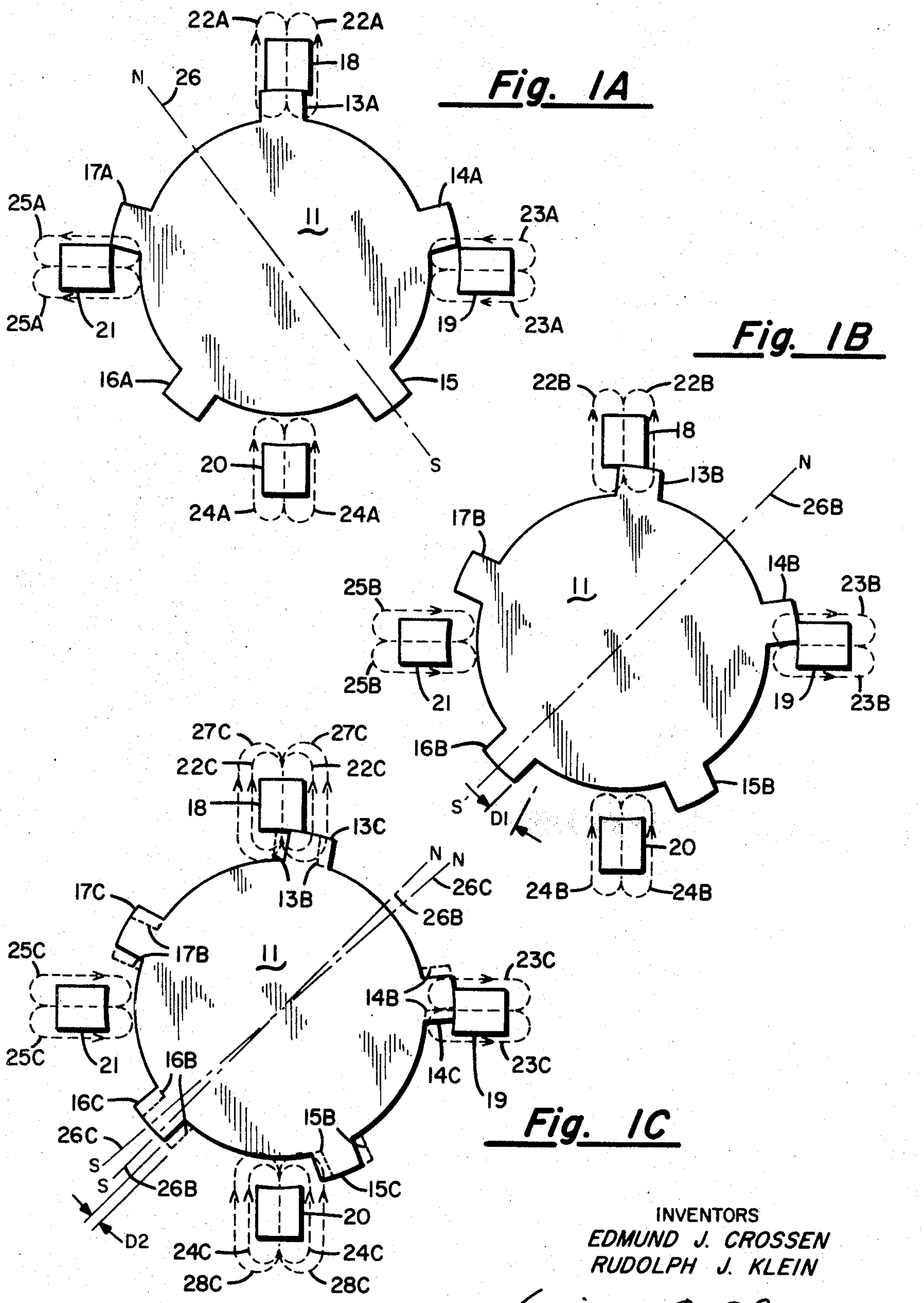
FIG. 1A is a schematic of a magnetic detent motor rotor and stators in a first position.
FIG. 1B is a schematic of the magnetic detent motor rotor and stators shown in FIG. 1A but in a second position.
FIG. 1C is a schematic of the magnetic detent motor rotor and stators shown in FIG. 1B but in a third position.

Before considering the details of the circuitry of the present invention, let us examine the structure and the operation of the magnetic detent motor. FIG. 1A shows a schematic of the rotor and stators of a magnetic detent motor which may be employed in the present invention. It will be noted that the rotor 11 has five pole positions 13A, 14A, 15A, 16A and 17A. In addition the magnetic detent motor in FIG. 1A has four stators 18, 19, 20, 21. The rotor poles 13A, 14A, 15A, 16A and 17A are the same poles which are labelled 13B–17B and 13C–17C. However they bear different designations because they are in different positions in each of FIGS. 1A, 1B and 1C. This arrangement is only by way of example for the present description. Actually in the preferred embodiment the rotor has 200 pole pieces and there are 96 stators. Each of the stators has two coils wound thereon. The first coil on each stator is wound in phase with the first coil on its associated stator, i.e., the stator located 180° therefrom. The second coil on each stator is wound in phase with the second coil on its associated stator, i.e., the stator located 180° therefrom. When these stator windings are selectively energized they can provide magnetic flux patterns such as the magnetic flux patterns 22A, 23A, 24A and 25A. The magnetic flux patterns 22A, 23A, 24A and 25A are shown being formed in a certain direction and this depends upon the direction of the electrical current passing through the coils wound on the stators. If we consider that the electrical current passing through the first winding of the stator 18 is such as to produce the flux 22A, this same electrical current will produce the flux 24A at stator 20. In addition if we consider that the direction of the current passing through the first winding on stator 19 produces the flux 23A, this same current will produce the flux 25A at stator 21. It is to be understood that the rotor is permanently magnetized to produce north poles at each of its pole pieces. When the stator windings are energized, the resultant flux pattern creates an effective magnetic north pole-south pole phenomenon. Accordingly, the rotor 11 is shifted so that the rotor pole piece which is positioned closest to the effective south pole, i.e., the south pole created by the flux of the current in the stator windings, becomes aligned with that effective south pole. It follows that the rotor will position itself so that there is symmetry of magnetically conductive metal on each side of an imaginary line passing through the effective north-south poles.

If we consider that there is a flux pattern developed by the current in the windings of the stators 19 and 18 and another flux pattern developed by the current in the windings of the stators 20 and 21, then the loci of the midway points between these two patterns would be an imaginary line 26A defining a path between the effective north-south poles. Accordingly, the rotor would position itself so that the pole position 15 would align itself with the effective south pole and be evenly divided by the north-south line 26A.

If we were to change the phase of the current in the stators 21 and 19 so that the flux generated thereby represented the patterns 25B and 23B as shown in FIG. 1B, then there would be a first major flux pattern developed by the currents in the windings of stators 20 and 19 and a second major flux pattern developed by the current in the windings of stators 21 and 18. Under these circumstances the rotor 11 would move from its position in FIG. 1A to position itself so that the north-south line 26B would lie midway between these two flux patterns and hence the pole element 16B of the rotor 11 would be evenly divided by the north-south line 26B in FIG. 1B. Accordingly, the rotor would have moved the distance D1 shown in FIG. 1B.

If instead of actually changing the direction of the current flow, the system instead develops a stronger current in one set of stator windings, such as indicated by the additional flux lines shown in FIG. 1C, then the major flux pattern becomes somewhat re-aligned and there is a new north-south line 26C developed. In effect the rotor 11 is nudged slightly in a clockwise direction. The distance that it moves is D2 in FIG. 1C. The north-south line 26B in FIG. 1C is the north-south line that was indicated in FIG. 1B and the change of the orientation is shown by the relationship between the new north-south line 26C and the former north-south line 26B.

In FIG. 1C, the increase in the current value is depicted by the additional flux patterns 27C and 28C which are developed at stators 18 and 20.

Now in accordance with the operation of the present device, the coarse movement of the rotor (i.e., the large increments of movement) will be accomplished by changing the current direction in a pair of the stator windings such as was described in connection with FIGS. 1A and 1B. Such changes in current direction effect rather large steps of movement of the rotor. On the other hand, the fine adjustment will be accomplished by a routine of increasing the amplitude of the current in a pair of the stator windings such as described in connection with FIG. 1C. As the rotor is positioned, it positions the magnetic read heads because it is mechanically linked to a gear system which moves a bar holding a plurality of magnetic heads. The magnetic heads are used to read information from a disk and write information onto a disk.

Figure 2:
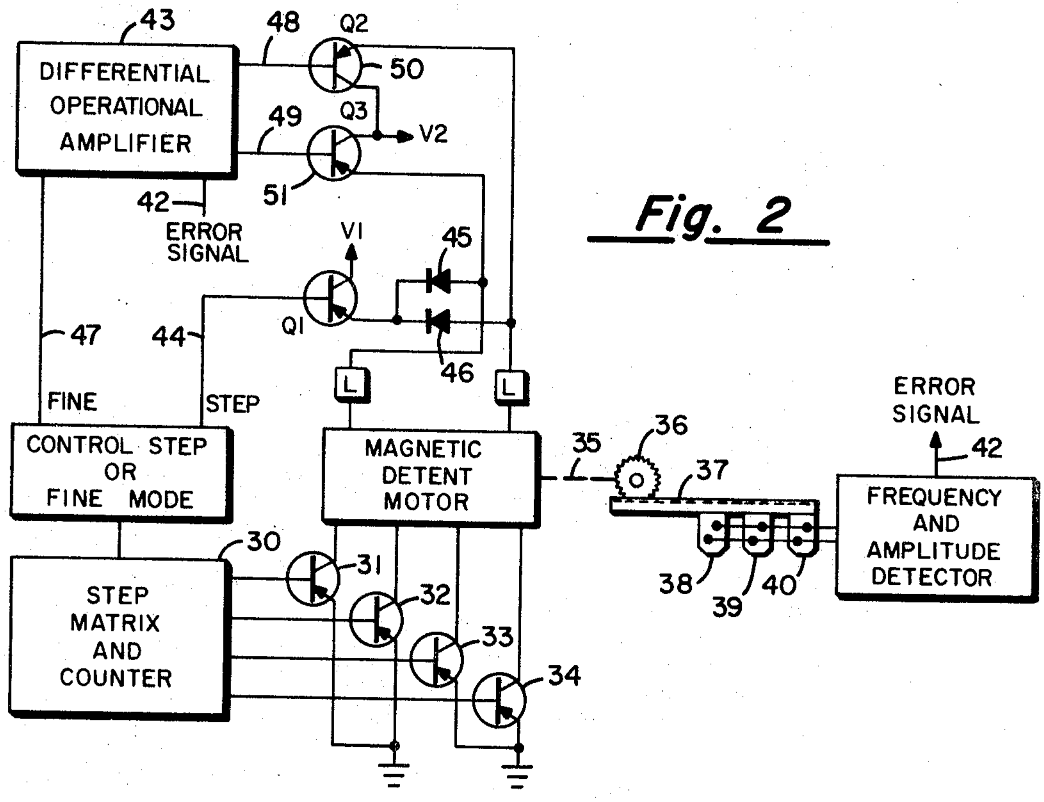
FIG. 2 is a schematic block diagram of the circuitry employed in the present system.

Consider now FIG. 2 which is a combination block diagram and schematic of the circuitry employed in the operation of the present system. In FIG. 2 there is shown a step matrix and counter block 30 which generates signals to energize two of the four transistors 31, 32, 33 and 34. Actually the system operates so that when transistor 31 is energized, either transistor 33 or transistor 34 is energized, and when the transistor 32 is energized either transistor 33 or transistor 34 is energized. The operation of these transistors will become more meaningful in connection with the description of FIG. 3. When the signals from the step matrix and counter device 30 energize, for instance the combination of transistors 31 and 33, two of the stator windings such as the windings on stators 21 and 19 in FIG. 1A, will be energized and accordingly the rotor 11 will be moved to be properly lined up with the field created by the current on the windings on the stators 21 and 19. When the rotor moves it is coupled to the shaft 35 which moves the gear 36 which in turn moves the bar 37. On the bar 37 there is shown a homing track read head 38. In addition there are shown two information read heads 39 and 40.

The homing track read head is a read head that receives two different frequency signals from adjacent homing tracks. In other words, each of the adjacent tracks of the series of homing tracks has a different frequency and two adjacent tracks will provide a combined signal at the homing track read head. This combined signal is transmitted to a pair of frequency filter devices. As will become more meaningful in connection with the discussion of FIG. 4, these different ferquency signals will be separated and the frequency signal from the track toward which the homing track read head is more closely located will provide a stronger error signal on line 42.

The error signal on line 42 is transmitted to the differential amplifier block 43. When the system has completed the coarse location of the rotor, the step signal which appears on line 44 will be terminated and hence the diodes 45 and 46 will be cut off. At the same time the "fine" signal appearing on line 47 will cause the system to go into a fine positioning routine. This fine signal, in combination with the error signal, will cause one of the two lines 48 or 49 to be energized with a greater signal than the other thereby respectively causing either the transistor 50 or transistor 51 to connect more heavily. In this way the fine positioning signals cause the operation which was described in connection with FIG. 1C.

Figure 3:
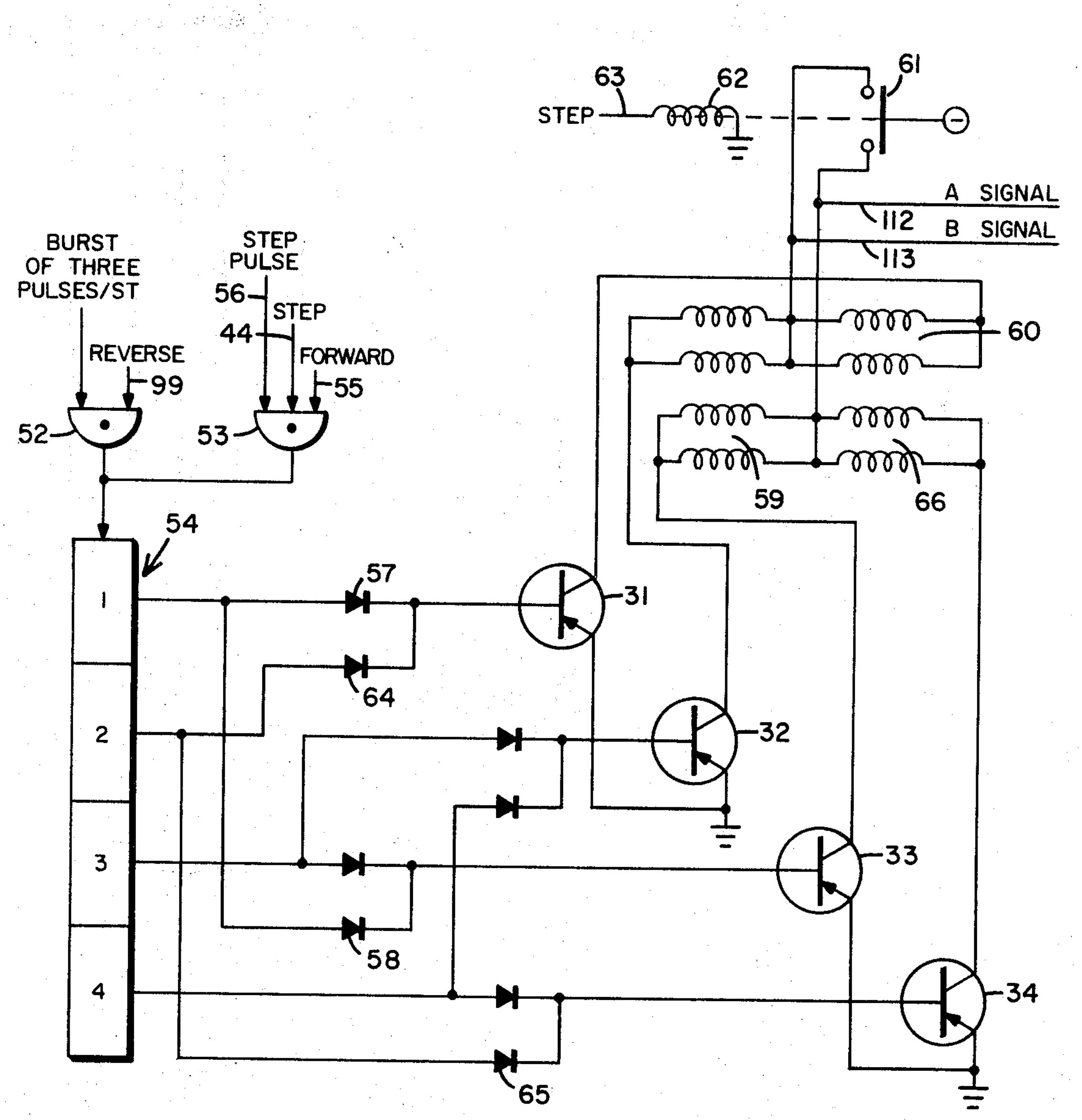
FIG. 3 is a schematic-block diagram of the circuitry employed as a step matrix and counter.

Now consider in more detail the circuitry of the blocks of FIG. 2. In FIG. 3 there is shown the circuitry which makes up the step matrix and counter circuitry connected to the four transistors 31, 32, 33 and 34. The circuitry which makes up the step matrix counter circuit includes a pair of AND gates 52 and 53 from which signals are transmitted into the ring counter 54. If the ring counter 54 is to go into the forward direction the step signal which is the same as the signal on line 44 (FIG. 2) is transmitted to the gate 53. Meantime a forward signal on line 55 is also transmitted to the gate 53. Accordingly, each time a step pulse appears on line 56 the ring 54 is advanced and certain of the diodes in the matrix are energized. For instance, when the ring counter is in the number one position the diodes 57 and 58 are forward-biased and accordingly the transistors 31 and 33 are turned on to energize the coils 59 and 60 provided that the switch 61 is closed. The switch 61 is closed when the relay coil 62 becomes energized, and coil 62 becomes energized in response to the step signal appearing on line 63.

Now it should be recognized that the coils 60 represent coils on stators which are 180° out of phase, physically, just as the coils on 59 represent windings on stators which are 180° out of phase physically.

As the ring counter moves to stage 2, the diode 64 and 65 become energized thereby turning on the transistor 31 and the transistor 34. Accordingly, the coils 60 become energized while the coils 66 also become energized. This represents the change in phase of the current as described with FIG. 1B.

The continuation of the stepping of the ring counter through stages 3 and 4 and back to stage 1 is straightforward and no further explanation thereof seems necessary. Ring counter 54 can be any of the standard ring counters which are well known in data processing art.

Figure 4:
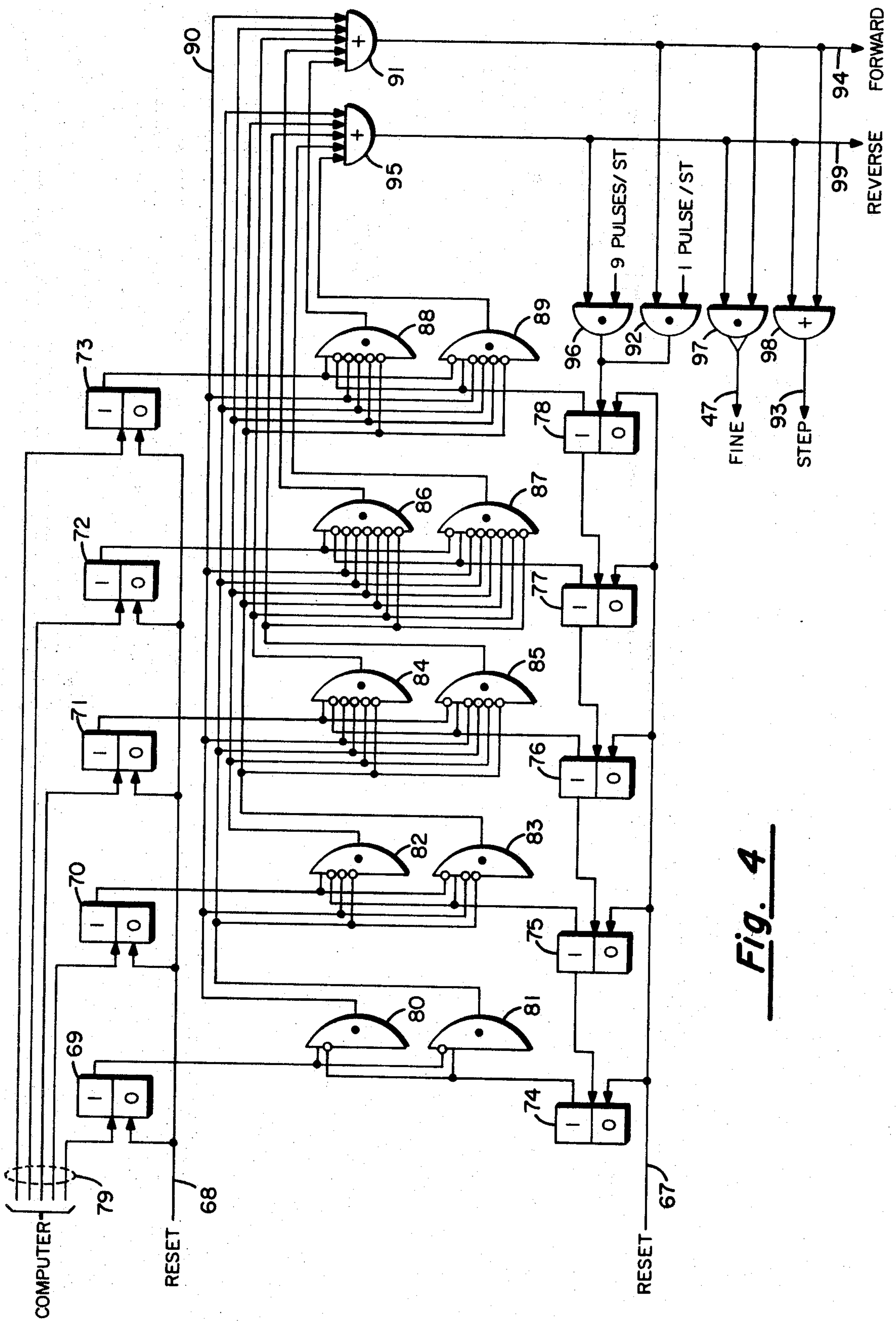
FIG. 4 is a schematic-block diagram of the circuitry employed as a comparator and a control signal generator.

Consider now FIG. 4 which shows a means for generating the "reverse" and "forward" signals as well as generating the "fine" and "step" signals. Assuming for the moment that the bar with the magnetic read heads thereon has been returned to a start position, there would be reset signals generated on lines 67 and 68 to reset the flip-flops 69 through 78. Now further assume that the computer has been programmed to read information from certain tracks whose address is transmitted on the lines 79 and inserted into the flip-flops 69 through 73. The circuitry of FIG. 4 provides a plurality of AND gates 80 through 89 which are connected to act as a comparator between the two banks of flip-flops just described. The first bank of flip-flops 69 through 73, is the bank of flip-flops into which the new address of the magnetic heads is entered. In other words, the position address of the tracks to which the magnetic read heads are to be moved. The flip-flops 74 through 78 represent a bank of flip-flops which indicate where the bar, or read heads, are presently located. If we have initially located the heads in a start position as just suggested then the re-set signals will set the bank of flip-flops 74 through 78 to zero. It will be noted that the one side of the flip-flop 69 is connected to provide a positive signal to the AND gate 80 and an inhibit signal to the AND gate 81. The one side of the flip-flop 74 provides a positive signal to the AND gate 81 and an inhibit signal to the AND gate 80. Accordingly, if there is a "1" signal present from each of the flip-flops 69 and 74 neither of the AND gates 80 or 81 will provide a positive output. Both AND gates will provide an output signal which will be a new inhibit signal when it is transmitted to the AND gates 82 through 89. On the other hand, if there is a "1" signal present in the flip-flop 69 and a "0" present in the flip-flop 74 then the AND gate 80 will have two positive signals thereto and will provide a positive output on the line 90 which is transmitted to the OR gate 91. This positive signal will act as an inhibit signal on each of the AND gates 82 through 89. If each of the AND gates 82 through 89 is traced out it will be found that similar circuits are connected thereto so that the high order positions, namely, 69 and 74, have the first priority and the lesser order positions have an increasing lesser priority.

In the case just illustrated the bank of flip-flops 69 through 73 has the higher number since the bank of flip-flops 74 through 78 is set at "0." Accordingly, the signal on 90 is transmitted through the OR gate 91 to the AND gate 92. In addition there is a one pulse per step pulse applied to the AND gate 92 to provide advancing signals to the flip-flop 74 through 78 and thereby advance the counter arranged with these last mentioned flip-flops.

At the same time the signal from the OR gate 91 is transmitted to the OR gate 93. The output of the OR gate 93 is the step signal which we have previously considered in connection with the description of FIG. 3, in particular to pick up the relay 62 and also to partially condition the AND gate 53 in FIG. 3. Also simultaneously there is a signal on line 94 which is the forward signal. We have seen that the forward signal is also transmitted to the gate 53 to partially condition that gate so that the ring counter 54 will be advanced in a forward direction. One direction of the rotor is considered a forward direction and the other direction is considered the reverse direction. If we assume that the magnetic read heads are located some place on the tracks and have to be relocated toward the home position then the new address which would be entered into the flip-flop 69 through 73 would be less in numerical value and the current address of the magnetic read heads. The current address is found in the flip-flops 74 through 78. Accordingly, the OR gate 95 would be energized by certain of the lines connected thereto and the output signal therefrom would be transmitted to the gate 96. The gate 96 has another signal line applied thereto which provides nine pulses per step pulse. The nine pulses in the step cause the counter represented by the flip-flops 74 through 78 to substract 1 from each step. In this way the counter made up of the flip-flops 74 through 78 is decremented.

At the same time the signal from the OR gate 95 is transmitted to the inverter AND gate 97, but since there is no signal from the OR gate 91 there is no output from the inverter AND gate 97. The signal from the OR gate 95 is further transmitted to the OR gate 98 which provides a step output signal. At the same time the signal from the OR gate 95 provides the reverse signal on line 99.

It will be recalled that the reverse signal on line 99 is transmitted to the AND gate 52 in FIG. 3 and also transmitted to the AND gate 52 is a burst of three pulses per step. The burst of three pulses per step in effect causes the ring counter 54 to count backwards and accordingly advance the rotor in a reverse direction.

Figure 5:
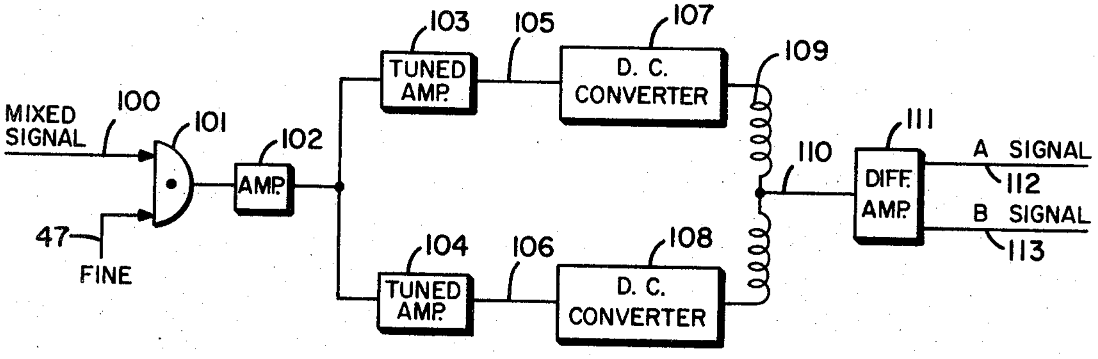
FIG. 5 is a schematic-block diagram of the frequency and amplitude signal detector coupled to a differential amplifier.

Finally consider FIG. 5 which shows the circuitry used in conjunction with the differential opeartional amplifier block 43. It will be recalled that there is a set of tracks on the disk which is so arranged that adjacent tracks have been recorded at different frequencies. A head which is located at these tarcks is subjected to the signals from two adjacent tracks which have different frequencies and accordingly generates a mixed signal which is the addition and subtraction of the two signals to which it is subjected. The mixed signal is transmitted on the line 100 to the AND gate 101. Also applied to the AND gate 101 is the fine signal which is appearing on line 47 in FIGS. 2 and 4 as well as FIG. 5. When we have completed the coarse stepping mechanism and the comparison is equal, as generated in the circuitry of FIG. 4, there will be no output from either OR gate 95 or 91 in FIG. 4 and accordingly there will be an output signal from the Inverter AND gate 97. This output singal will be a "fine" signal. The fine signal being thus generated, the AND gate 101 will be ready to accept the mixed signal. The mixed signal will be transmitted to the amplifier 102 for amplification and further to both the tuned amplifiers 103 and 104. At the tuned amplifiers 103 and 104, the mixed signal is separated and the single freqeuncy is transmitted along the line 105 and another single frequency singal is tarnsmitted along the line 106. The A.C. singals on 105 and 106 are respectively transmitted to the D.C. converters 107 and 108. From the D.C. converters 107 and 108 the D.C. signal is transmitted to the summation signal network 109 which is simply a resistor network. The summation network has a center tap by virtue of which there is provided a signal which follows the input signal of the larger amplitude. For example, if the homing track read head is positioned more closely in one direction than another the frequency signal representing that direction toward which it is positioned will have a larger A.C. signal on either line 105 or 106 and hence a larger D.C. signal from either the D.C. converter 107 or 108. Accordingly, the signal which appears on line 110 will represent either a plus or a minus value, representing the singal appearing at either the D.C. converter 107 or 108. Once the signal is developed on line 110 the differential amplifier 111 produces a larger signal either on line 112 or on line 113 which larger signal represents the larger signal applied to the summation circuit 109. Assume that there is a larger singal developed on line 105, than the larger signal in our example would appear on line 112 and would be transmitted on line 112 (FIG. 3) to simply apply more current to either the windings 66 or 59. The further circuit path choice would depend on whether the transistors 33 or 34 are energized. In this way the rotor will be nudged for a small increment of movement in accordance with the additional current passing through either the windings 66 or 59. While one of the other transistors, either transistor 31 or transistor 33 may be selected at this time, it will not conduct more than noramlly because there will be no signal greater than normal on line 113. It should also be noted that when the step signal was no longer provided, at the time that the comparator in FIG. 3 became equal, the relay 62 became de-energized and the switch 61 dropped out.

Hence, we have followed through the coarse setting of the rotor and the fine setting of the rotor as initially described in general.

The embodiments of the invention in which an exclusive property or privilege is claimed are defined as follows:

1. A system to effect coarse and fine positioning of magnetic read-write heads which are used with a magnetic recording medium, comprising in combination: magnetic detent motor means having N stators with windings thereon and rotor means with M magnetically polarized pole pieces thereon where M is not equal to N; mounting means holding magnetic read-write heads and engaged with said rotor means for movement in response to movement of said rotor means; coarse positioning circuitry means coupled to said windings on said stators to selectively pass out of phase electrical currents through adjacent stator windings to generate magnetic flux patterns respectively defining north-south pole paths in response thereto, thereby causing said rotor means to rotate and become positioned on each occasion in accordance with said defined north-south pole paths; fine positioning circuitry means coupled to said findings on said stators to provide first electrical current through particular ones of said stator windings and to provide second electrical current through other stator windings which lie adjacent to said particular ones of said stator windings wherein said first electrical current and said second electrical current are of the same phase and wherein when said first electrical current is greater than said second electrical current, said rotor will be caused to rotate a small distance toward the stators whose windings carry said electric current.

2. A system to effect coarse and fine positioning of magnetic read-write heads according to claim 1 wherein said magnetic recording medium has a plurality of homing tracks thereon and wherein every other homing track has a frequency signal recorded thereon which is different from the frequency signal recorded on its adjacent homing track and wherein said fine positioning circuitry means includes frequency and amplitude detector circuitry and wherein one of said read-write heads is a homing read-write head and is held by said mounting means to be physically positioned in proximity to said homing tracks and is electrically connected to said frequency and amplitude detector circuitry whereby when said homing read-write head is not physically located in the center between two adjacent homing tracks, an error signal will be developed by said frequency and amplitude detector circuitry to cause said fine positioning circuitry means to generate said first and second electrical currents.

3. A system to effect coarse and fine positioning of magnetic read-write heads according to claim 2 wherein said frequency and amplitude detector circuitry includes a first and second tuned amplifier, a first and second D.C. converter with said first D.C. converter connected to said first tuned amplifier and said second D.C. converter connected to said second tuned amplifier and a differential amplifier connected in common to said first and second D.C. converter to provide first and second output signals respectively in response to said homing track read-write head being positioned off the center between two adjacent homing tracks toward said homing track carrying said first frequency signal and alternatively toward said homing track carrying said second frequency signal.

4. A system to effect coarse and fine prositioning of magnetic read-write heads in accordance with claim 1 wherein said coarse positioning circuitry includes a step matrix circuit means and counter circuit means having a plurality of output lines arranged such that said output lines will be energized according to selected pairs in order to effect differently defined north-south pole paths with respect to said rotor means.

5. A system to effect coarse and fine positioning of magnetic read-write heads according to claim 1 wherein said coarse positioning circuitry means includes first register means to accept address information signals indicating where said magnetic read-write heads should be located; second register means capable of holding address information indicating where said read-write heads are actually located and comparison means connected between said first and second register means to generate control signals in response to a comparison between the address information of said two registers in order to cause said read-write heads to be moved until said comparison detects that said address information is identical in both registers.

References Cited

UNITED STATES PATENTS

| | | | |
|---|---|---|---|
| 3,209,338 | 9/1965 | Romuari | 340—174.1 |
| 3,221,191 | 11/1965 | Cuches et al. | 335—272 |
| 3,263,031 | 7/1966 | Welsh | 340—174.1 |
| 3,363,159 | 1/1968 | Bollhoefer | 335—268 |
| 3,435,392 | 3/1969 | Ouellette | 335—272 |
| 3,470,509 | 9/1969 | Silverman et al. | 335—268 |

BERNARD KONICK, Primary Examiner

V. P. CANNEY, Assistant Examiner

U.S. Cl. X.R.

335—268